United States Patent
Fels

(10) Patent No.: US 7,415,116 B1
(45) Date of Patent: Aug. 19, 2008

(54) METHOD AND SYSTEM FOR IMPROVING COMMUNICATION IN A VEHICLE

(75) Inventor: Peter Fels, Berlin (DE)

(73) Assignee: Deutsche Telekom AG, Bonn (DE)

( * ) Notice: Subject to any disclaimer, the term of this patent is extended or adjusted under 35 U.S.C. 154(b) by 556 days.

(21) Appl. No.: 10/148,433

(22) PCT Filed: Nov. 9, 2000

(86) PCT No.: PCT/EP00/11071

§ 371 (c)(1),
(2), (4) Date: May 29, 2002

(87) PCT Pub. No.: WO01/41499

PCT Pub. Date: Jun. 7, 2001

(30) Foreign Application Priority Data

Nov. 29, 1999 (DE) .................................. 199 58 836

(51) Int. Cl.
H04B 1/00 (2006.01)
H03G 3/20 (2006.01)
H03R 3/00 (2006.01)

(52) U.S. Cl. ......................................... 381/86; 381/110

(58) Field of Classification Search .................. 381/86, 381/71.4, 77, 79, 91, 110, 102, 104, 107; 455/345

See application file for complete search history.

(56) References Cited

U.S. PATENT DOCUMENTS

| 4,638,287 A | 1/1987 | Umebayashi et al. |
| 4,965,833 A * | 10/1990 | McGregor et al. ............. 381/86 |
| 6,363,156 B1 * | 3/2002 | Roddy ........................ 381/86 |
| 6,535,609 B1 * | 3/2003 | Finn et al. ..................... 381/86 |

FOREIGN PATENT DOCUMENTS

| DE | 34 131 81 | 10/1986 |
| DE | 40 42 116 | 7/1991 |
| DE | 43 08 398 | 1/1996 |
| DE | 196 20 980 | 11/1997 |
| DE | 198 12 697 | 9/1999 |
| DE | 198 14 971 | 10/1999 |
| EP | 0 712 264 | 5/1996 |
| EP | 0 721 178 | 7/1996 |
| WO | WO 97/27724 | 7/1997 |

OTHER PUBLICATIONS

Patent Abstracts of Japan, JP 02-312349 abstract (Fujitsu Ten Ltd., Dec. 27, 1990), vol. 15, No. 106, Mar. 13, 1991.

* cited by examiner

*Primary Examiner*—Xu Mei
(74) *Attorney, Agent, or Firm*—Keyon & Keyon LLP

(57) ABSTRACT

An embodiment and/or method to improve communication in a vehicle. Voice signals of the occupants of a vehicle may be picked up on an individual basis via separately arranged microphones. The individually picked-up voice signals may then be amplified separately for each occupant in an input stage and filtered for purposes of minimizing interference levels and for frequency adaptation. The signals may be subjected in a process stage to a signal processing that may be specific to each output channel, in the form of a delay correction and a level differentiation. And, via an adaptation stage having a level adaptation, the signals may then be distributed to likewise separately assigned loudspeakers, in accordance with the spatial conditions of the vehicle and the desired loudness level. The embodiment and/or method may be effectively used in passenger cars, larger vehicles including multimedia buses and trucks, ships, trains and airplanes/airborne spaces.

9 Claims, 2 Drawing Sheets

METHOD AND SYSTEM FOR IMPROVING COMMUNICATION IN A VEHICLE

FIELD OF THE INVENTION

The present invention relates to improving internal communication in a vehicle.

BACKGROUND INFORMATION

The reference German Patent No. DE 196 20 980 purportedly concerns an audio device for a vehicle where phone conversations are processed using an appropriate voice- or signal-controlled allocation, such that an allocation to the individual engaged in the phone conversation is made, but also in such a way that the positioning is freely defined purely by an intensity control.

The reference German Patent No. DE 43 08 398 purportedly concerns an approach for an active noise reduction system for a passenger compartment of a motor vehicle by diminishing vibrational noises generated by a four-cylinder, four-stroke engine and transmitted to the passenger compartment.

Approaches directed to reducing noise in passenger compartments may create better conditions, both for internal communication within the passenger cell, as well as for external communication from the passenger cell to the outside, for example via radio paging. Such systems may, in fact, be able to reduce disturbing noises, but they are not able to completely compensate for these noises.

Even when engine and driving noises are reduced to the greatest possible extent, the underlying problem of communication within a passenger cell still persists. This is due in part to the seating arrangement within the passenger cell. In order to communicate well, i.e., to be heard clearly, within the passenger cell, particularly in conversations involving individuals in the front as well as in the rear areas of the passenger cell, each person participating in the conversation may oftentimes be forced to change position, posture or even voice volume to be understood in the conversation. This can mean that the driver and front-seat passenger must turn their heads around somewhat to the back and that the rear passengers may have to lean forward somewhat to be able to understand one another clearly. A situation of this kind inevitably can impair the driver's concentration and attentiveness to driving the vehicle, and therefore may compromise the safety of the vehicle's passengers and the vehicle, as well as any other vehicles and/or persons in the general vicinity.

The reference German Patent No. DE 34 131 81 purportedly concerns a large-room acoustic irradiation system for radiating large rooms or open spaces with sound according to principles of amplification or simulation, which is approximately true to time and, to the extent that is necessary, to sound level, of sonic fields propagating from the source via the area of action into the reception area, with a temporal source priority. This means that the acoustic radiators do not radiate until after the wavefronts of the original acoustic sources, i.e., of the acoustic radiator simulating these and of the acoustic radiators closer to the source, have passed, and that the time intervals or the amplifications are differentiated by capacity and type of source. This approach purportedly concerns itself alleviating the contradiction between propagation-delay and amplitude localization, even in transition regions where the first audible acoustic radiator is located, instead of the original sound source, when the comparison is made. Accordingly, the approach appears directed to the source, the area of action, and the acoustic radiator locations, and considers the acoustic capacity of the sources.

The reference European Patent Publication No. 0 712 264 purportedly concerns a multichannel sound reproduction method and apparatus. This reference refers to reproducing multichannel sound programs as adapted programs, but virtually in conformance with the standard.

SUMMARY

Exemplary embodiments and/or exemplary methods according to the present invention may be directed to optimizing the supplying of sound, or sound irradiation, and thus to improving, internal communication in vehicles.

Further exemplary embodiments and/or exemplary methods according to the present invention may be directed to using current technology, thus, using level controllers to assign the mostly two-channel signal components, made available via storage media or audio transmissions, to loudspeakers, at different level components, as dosed, or proportioned signal components. The signals may be distributed over all existing loudspeakers exclusively on the basis of a level distribution determination.

Further exemplary embodiments and/or exemplary methods according to the present invention may be directed to picking up sound signals in a room or space and outputting the sound signals in the same room or space, subject to observation of the sound signals' position and spatial characteristics.

Further exemplary embodiments and/or exemplary methods according to the present invention may be directed to improving the communication among the individuals located inside the passenger cell of a vehicle, while also improving the communication between these individuals and voice-communication systems outside of the vehicle.

Further exemplary embodiments and/or exemplary methods according to the present invention may be directed to picking up and reproducing signals in a closed space, and may take into account the position and other characteristics of the picked-up signals during reproduction.

DETAILED DESCRIPTION

Figure 1:
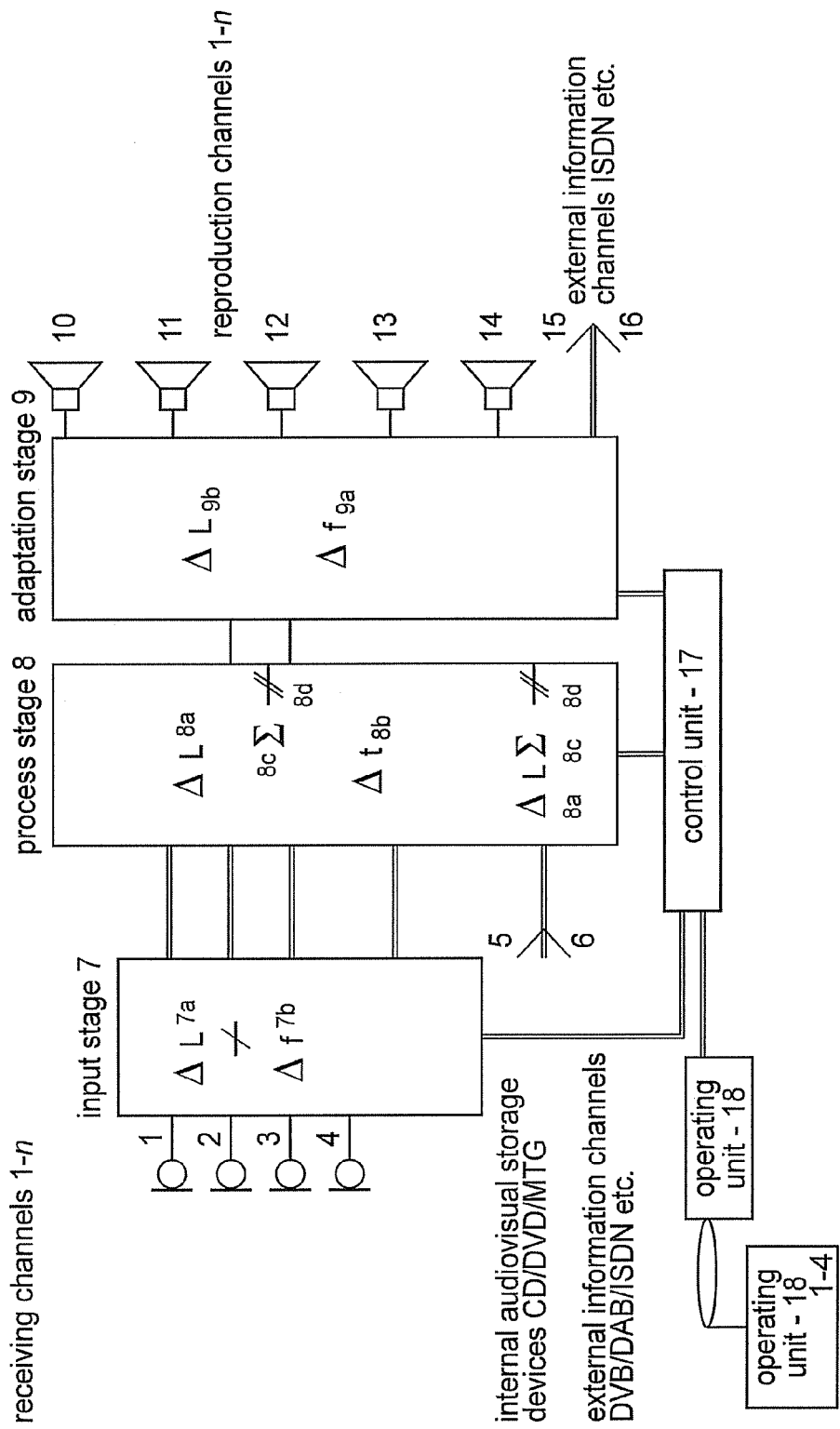
FIG. 1 shows an exemplary embodiment and/or method for improving communication within a vehicle's passenger space.

Referring to FIG. 1, there is shown an exemplary embodiment and/or method for improving communication within a vehicle's passenger compartment. A microphone or microphones M1-M4 and a loudspeaker array L10-L14 may be assigned to each seat at the appropriate location, for example, seat or head position. The voice signals picked up by microphones M1-M4 may be distributed via a processor circuit among all or at least among a large portion of built-in loudspeakers L10-L14 at different levels and different propagation delays, as a function of the pick-up position and the positions of the reproduction devices. At the same time, the frequency may be influenced in the receiving channel to limit the interfering signal components and to adapt the sound and, in the reproduction channel, to adapt the acoustics of the space to the loudspeaker position and to the passenger compartment determined by the vehicle type.

Via microphones M1-M4 assigned to the individual who is speaking in the particular instance, a received voice signal attains an input stage 7 having a microphone amplifier 7a and the associated level adjustment, as well as input filter 7b for interference level minimization and frequency adaptation. The signal then attains process stage 8, where it may be split into as many signal paths as there are output channels present. In these signal paths, in dependence upon the allocation of output channels to each signal path, a signal processing is undertaken in the form of a delay, or transit-time or propagation, correction via a module to delay correction 8a, and a level differentiation is performed via a module to level differentiation 8b. The level differentiation first considers the position of the signal reception, i.e., microphones M1-M4, and secondly the positions of loudspeakers L10-L14, distributed in an array, which are connected to the individual output channels. Each signal path is connected on the output side to a summing stage 8c and to a distribution stage 8d, whose number conforms to the number of output channels, in order to assign, from each input path, the signal that is picked up by the individual microphones M1-M4 and is processed separately in each of the signal paths, to the individual output paths. This ensures that the input signal(s) is/are able to be reproduced in a specific form by each loudspeaker L10-L14. Following summing stage 8c and distribution stage 8d, the processed signal may attain an adaptation stage 9 having the number of channels intended for supplying the signal to all loudspeakers L10-L14 considered to be necessary. When multichannel sound programs are transmitted for a four-passenger vehicle, it is necessary to increase the number of loudspeakers by at least one additional, fifth loudspeaker. In adaptation stage 9, a further level adaptation may be performed via a module for level adaptation 9a, and a frequency adaptation is performed via a room-correction filter for frequency adaptation 9b, which is intended to allow for the spatial conditions of the vehicle. At the same time, it is possible to devise the influencing of sound level on an individual basis. Other input channels 5/6 and output channels 15/16, respectively, linked to input stage 7 and to adaptation stage 9, may be provided for external connections, such as telephones, for recording possibilities, for participation in video conferences, inter alia. The signal processing and signal allocation enable the voice signal picked up at any one time inside the vehicle to be distributed over the loudspeaker array in such a way that the internal communication is substantially improved.

Figure 2:
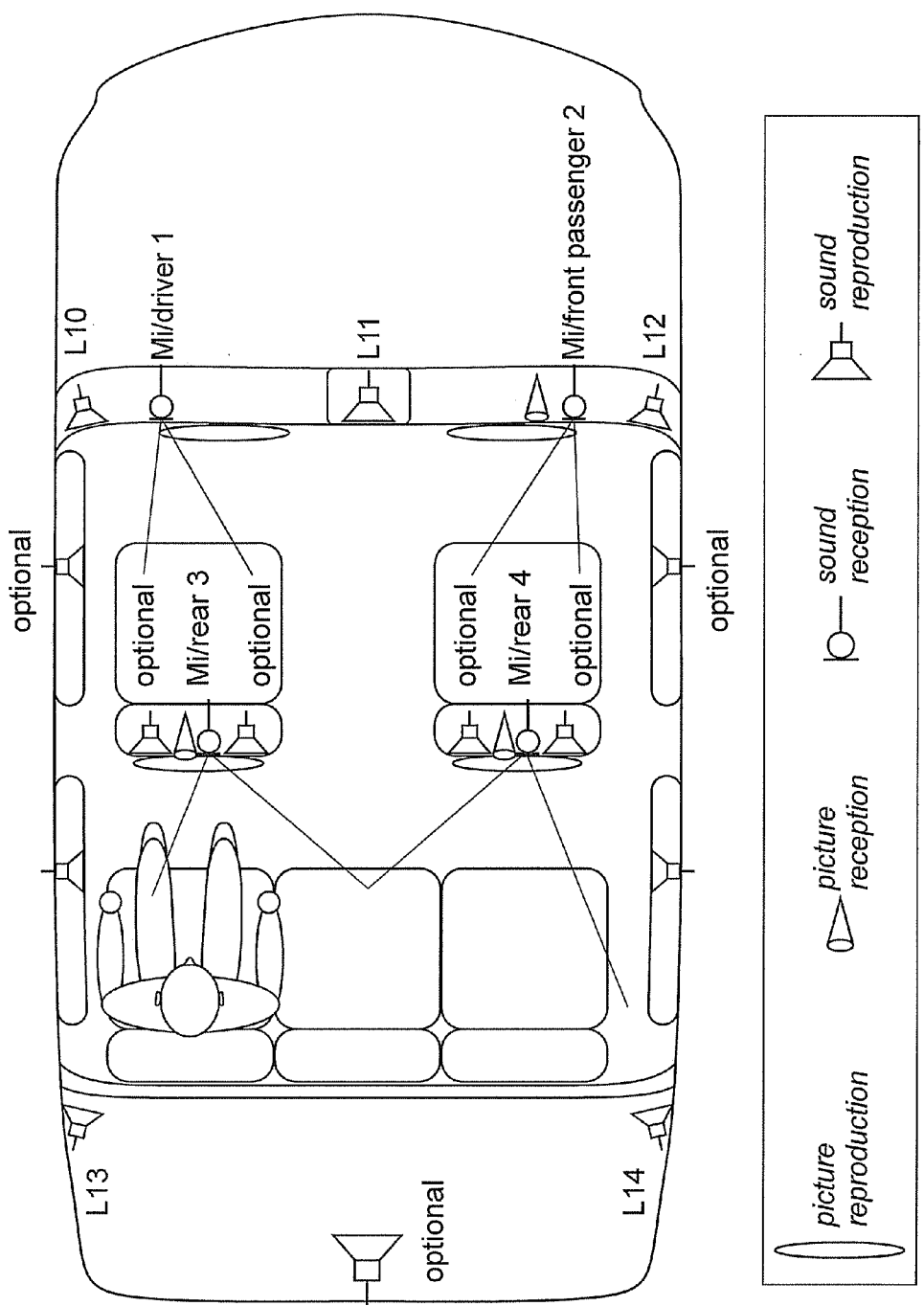
FIG. 2 shows an exemplary embodiment and/or method for improving communication for a five-seat passenger space.

Referring to FIG. 2, an exemplary embodiment and/or exemplary method according to the present invention is shown for a vehicle having five seats. A microphone array and a loudspeaker array are allocated to each seat, at an appropriate location. In this context, the microphone array is made up of microphones M1-M4. In the front area, the vehicle's dashboard offers a practical solution for mounting microphones M1-M2. When directional microphones are used, a side mounting in the respective door moldings is also possible, for example. For example, in the rear area of the passenger cell, microphones M3-M4 may be mounted in the seat backs of the front seats, or in the case of directional microphones, for example, microphones M3-M4 may be mounted in the sides of the vehicle body. An individual microphone may or may not (shown in FIG. 2 as not allocated) be allocated to the fifth passenger, whose seat is located between the seats of passengers 3 and 4. The fifth passenger may have the option of using microphones M3 and M4. Microphones M1-M4 may be connected to an input stage 7, which may be composed of n-channel inputs to level- and frequency influencing 7a/b, n corresponding to the number vehicle occupants. The inputs may be switched over via a switching element to incoming signals from the outside, for example, input external information channels DVB/DAB/ISDN 5, and/or from internal storage media, for example, input audiovisual internal storage devices CD/DVD/MTG 6.

In a process stage 8 downstream from input stage 7, the incoming input signals from microphones M1-M4 are processed via modules for delay correction $8a_{1-5}$ using different delay, or propagation, times and via models for level differentiation $8b_{1-5}$ using different levels, summed in summing stages $8c_{1-5}$, and distributed via distribution stages $8d_{1-5}$ over the selected output channels. The differentiated distribution and the outputting of the voice signals to individual loudspeakers L10-L14 takes place via an adaptation stage 9 having room-correction filters $9b_{1-5}$ and level-adaptation stages $9a_{1-5}$. The incoming signals may be processed in accordance with their content, for example, telephone signal, multimedia signal, inter alia, using signal engineering and distributed among loudspeakers L10-L14, tailored to the reproduction device. If needed, a switchover may be made to outputs for external information channels 15/16.

In further exemplary embodiments and/or exemplary methods, the above-described sound-engineering system may also be coupled, for example, to a central picture-reproduction device 19 or to a picture receiving device $19_{1-4}$ assigned to the individual seats. A complex multimedia use of the communication system may thus be available.

In further exemplary embodiments and/or exemplary methods, the system may be controlled via a control unit 17 in which preset settings and usage variants are stored as retrievable set-ups. In addition, control unit 17 may be linked to a central operating unit 18, which may be assigned to the driver and thus may enable influence to be exerted in a centralized fashion, and may be linked to distributed, or decentralized, operating units $18_{1-4}$ assigned to the individual seats.

In further exemplary embodiments and/or exemplary methods, control unit 17 may be driven by external signals. By utilizing a mutually complementary and effective propagation-delay and level correction along the lines of the present invention, a simultaneous processing and seat-independent reproduction of a plurality of sound centers, i.e., signal sources, up to the inclusion of multichannel stereophony, may be ensured inside the passenger cell. This special signal processing may substantially improve the acoustic decoupling of the receiving and reproduction channels as merely a pure amplification optimization.

Additional input filters inserted into the particular intended microphone inputs of microphones M1-M4 may be used to attenuate the internal noise signals as interference components and to optimize the microphone signals. The sound adaptation may be optimized in the particular vehicle using output filters. The communication system in accordance with the present invention may also be used for other usage variants which are directed to communication with external users. Thus, a use as a telephone device having a free assignment of users within the vehicle may be available according to the present invention. A further exemplary embodiment and/or exemplary method may include the present invention used as a video-conferencing system. A further exemplary embodiment and/or exemplary method may include the present invention being used to retrieve multimedia program material from internal memories or from externally received signals.

In the case of a use within the framework of telephone processes, the present invention allows for a conversation to be assigned, for example, to each seat and/or to each occupant. The reproduction may take place as a controlled process via selected loudspeakers, so that even selected vehicle occupants may participate in the telephone conversation. At the same time, the extent to which other occupants in specific seats overhear the conversation may also be controlled and/or limited. Such may be effected by switching the incoming signal to loudspeakers chosen for this and by processing it as a fictive, i.e., a virtual voice source. The outgoing signal or signals may undergo the same process as the signal or signals utilized for the internal communication. In further exemplary embodiments and/or exemplary methods, the manner in which specific seats or areas are separated or dequeued both from the receiving, as well as from the reproduction side, may be adjusted using operating units of control unit 17. This can allow the holding of telephone conferences. In further exemplary embodiments and/or exemplary methods, video signals are processed in a similar manner, allowing for the further inclusion that the vehicle is provided with picture-receiving and reproduction devices. In this manner, the precondition is created for a video conference with external remote terminals, or receivers. At the same time, the picture devices for TV programs and multimedia services may also be used. The audio signals may be assigned accordingly, so that an optimal multichannel reproduction may follow for each seat.

In further exemplary embodiments and/or exemplary methods, a control program 17 may be utilized and may be fetched both by central operating unit 18 in the vicinity of the vehicle driver, as well as, to a limited degree, by the individual vehicle occupants, in that a simplified variant of operating unit $18_{1-4}$ may be provided in the vicinity of the individual seats.

In further exemplary embodiments and/or exemplary methods, when internally stored or externally supplied programs are reproduced in picture and/or sound, the single- or multi-channel signals may likewise be assigned to the individual internal seats or supplied areas. Thus, a recording on available storage media may take place, for example, via connections having preselected output channels 1-$n$.

By distributing the microphone signals over all loudspeakers L10-L14 using different signal processing (propagation delay and level), the present invention may provide for excellent intelligibility, that is a conducive environment for intelligible conversation, in the entire area of the vehicle passenger cell, while at the same time minimizing the danger of feedback coupling by employing appropriate control mechanisms. Each occupant may be able to freely select whether or not to participate in the communication, or conversation.

In further exemplary embodiments and/or exemplary methods according to the present invention, a further combination with multimedia services in a simple form may be provided. Such may include phoning from each seat, shared phone conference applications, a simultaneous integration of the picture reproduction and reception, for the front seats and/or the seats in the rear area. The present invention further allows improvement of radio and/or television broadcasts, for example, among other receivable information.

The present invention further allows for use in larger vehicles, for example, special vehicles designed as multimedia buses, as well as in trucks and other means of transportation including ships, trains, and airplanes. These spaces may require a larger number of receiving and reproduction channels, i.e., reproduction devices, and custom tailored signal processing units, according to the present invention.

What is claimed is:

1. A method for improving communication in a vehicle, comprising:

assigning at least one occupant in an area of a seat inside the vehicle with a respective microphone;

picking up a voice signal of the at least one occupant of the vehicle by the respective microphone;

amplifying the picked-up voice signal in an input stage;

filtering the amplified picked-up voice signal for purposes of interference level minimization and frequency adaptation;

providing a voice-output device, the voice-output device including at least one loudspeaker configured to output the voice signal, each loudspeaker of the at least one loudspeaker being associated with at least one output channel;

signal processing the amplified and filtered voice signal of the at least one occupant via a summing and distribution stage, the signal processing being specific to each respective at least one output channel in the form of a delay correction and a level differentiation in a process stage as a function of a local allocation of the microphone that picked up the voice signal and as a function of a local allocation of the at least one loudspeaker of the voice-output device;

assigning the processed voice signal on an individual basis for each respective at least one output channel to the at least one loudspeaker of the voice-output device via an adaptation stage; and tuning an adaptation of the processed voice signal via a level adaptation and a frequency adaptation in the adaptation stage to a spatial condition of the vehicle and to a desired sound level.

2. The method as recited in claim 1, further comprising:

transmitting a signal supplied from one of an internal audiovisual storage device and an external information channel via an input channel connected to the input stage as tuned to the spatial condition of the vehicle via the process stage and the adaptation stage to the respective at least one output channel to at least one of the at least one loudspeaker and an individual component for picture reproduction depending upon a type of the signal supplied from the one of the internal audio visual storage device and the external information channel.

3. A system for improving communication in a vehicle, comprising:

a voice pick-up device including at least one microphone, each one of the at least one microphone being assigned to a respective seat of the vehicle;

a voice-output device including at least one loudspeaker, each one of the at least one loudspeaker being assigned to the respective seat of the vehicle;

a process stage including:
   a module for delay correction,
   a module for level differentiation,
   a summing stage, and
   a distribution stage;

an input stage via which each of the at least one microphone is connected to the process stage into order to minimize an interference level and to achieve a frequency adaptation, the input stage including a microphone amplifier and an input filter;

an adaptation stage including a level adaptation stage and a room correction filter for the frequency adaptation, the process stage being linked via the adaptation stage to the at least one loudspeaker, a central operating unit; and a control unit connected to the central operating unit and linked to the input stage, the process stage, and the adaptation stage.

4. The system as recited in claim 3, wherein the adaptation stage is connected to at least one external information channel.

5. The system as recited in claim 3, wherein the process stage is connected to at least one of an internal audiovisual storage device and an external information channel.

6. The system as recited in claim 3, wherein the process stage is connected to at least one of at least one external information channel and at least one internal audio visual storage device.

7. The system as recited in claim 3, wherein:
the input-stage is connected to at least one external information channel, and the at least one external information channel is connected via the process stage and the adaptation stage to the at least one loudspeaker.

8. The system as recited in claim 3, wherein the central operating unit is assigned to a front-passenger seat.

9. The system as recited in claim 3, wherein the control unit is connected to at least one operating unit assigned to a different seat and has limited functioning.

* * * * *